(12) United States Patent
Yamamura et al.

(10) Patent No.: US 7,251,045 B2
(45) Date of Patent: Jul. 31, 2007

(54) PRINTER DRIVER

(75) Inventors: Yoshihiro Yamamura, Kurume (JP); Kiyotaka Yamamoto, Ogoori (JP)

(73) Assignee: Matsushita Electric Industrial Co. Ltd., Osaka (JP)

(*) Notice: Subject to any disclaimer, the term of this patent is extended or adjusted under 35 U.S.C. 154(b) by 836 days.

(21) Appl. No.: 10/281,761

(22) Filed: Oct. 28, 2002

(65) Prior Publication Data

US 2003/0137681 A1    Jul. 24, 2003

(30) Foreign Application Priority Data

Jan. 18, 2002    (JP) .............................. 2002-009713

(51) Int. Cl.
*G06F 15/00* (2006.01)

(52) U.S. Cl. .................................... 358/1.13; 358/1.13

(58) Field of Classification Search ............... 358/1.13, 358/1.15, 1.14; 710/19; 719/327; 400/76; 709/200; 717/176
See application file for complete search history.

(56) References Cited

U.S. PATENT DOCUMENTS 6,327,051 B1 * 12/2001 Moro et al. ................. 358/1.9
6,674,535 B1 * 1/2004 Kim .......................... 358/1.15

FOREIGN PATENT DOCUMENTS

| JP | 8185294     | 7/1996 |
| JP | 9188007     | 7/1997 |
| JP | 2000-37933  | 2/2000 |
| JP | 2000-222159 A | 8/2000 |

* cited by examiner

*Primary Examiner*—King Y. Poon
*Assistant Examiner*—Saeid Ebrahimi
(74) *Attorney, Agent, or Firm*—Pearne & Gordon LLP

(57) ABSTRACT

A printer driver that permits a user to efficiently confirm the contents of a printing setup for a printer. For each of the printing setup entries, a printing setup comparison unit compares the initial printing setup contents with the current printing setup contents. When the printing setup comparison unit ascertains that a difference exists between the initial printing setup contents and the current printing setup contents, the printing setup comparison unit outputs, to a printing setup display unit, a differential printing setup that includes differential printing setup contents, which indicate the current printing setup contents for which the difference exists, and a differential printing setup entry, which is the printing setup entry that corresponds to the differential printing setup contents. The printing setup display unit displays the differential printing setup.

12 Claims, 8 Drawing Sheets

PRINTER DRIVER

FIELD OF THE INVENTION

The present invention relates to a printer driver that, in response to a command entered at a user interface (hereinafter referred to as a "UI"), confirms printing setup contents that are designated for a printer.

BACKGROUND OF THE INVENTION

It has been the general rule that various operations to be performed by a computer, such as a personal computer, a workstation or a portable information terminal, are assigned for the computer in response to commands entered at a UI. The printing setup for a printer is also performed through the manipulation of a UI provided by a printer driver. In addition, since very many entries are required to prepare a printing setup for a printer, usually the layout of the UI provided by a printer driver is so designed that associated entries are arranged and displayed by using tabs, thereby facilitating the preparation of a desired setup.

FIG. 4 is a diagram for explaining a conventional printer driver.

In FIG. 4, a printer driver 100 includes printer printing setup display means 150.

The operation of the printer driver 100 will now be described while referring to FIGS. 5 to 8. FIG. 5 is a diagram showing an example printing setup screen for a printer; FIG. 6 is a diagram showing an example setup screen when a paper tab is selected; FIG. 7 is a diagram showing an example setup screen when a setup tab is selected; and FIG. 8 is a diagram showing an example setup screen when a print quality tab is selected.

When a printing available environment is set for a computer and the printer driver 100 displays the printer printing setup, printing setup entries 111 and initial printing setup contents 112, which together constitute the initial printing setup 110 designated using the UI, are regarded as a current printing setup 120, and current printing setup contents 122 that correspond to the printing setup entries 111 assigned for each tab are displayed by printing setup display means 150. When a user employs the UI to change the printing setup contents, the current printing setup 120, which includes the current printing setup contents 122, is updated, and the current printing setup contents 122, which correspond to the printing setup entries 111 assigned for each tab, are displayed by the printing setup display means 150.

In FIG. 5, corresponding printing setup entries for the printer are arranged in a page setup tab 301, a paper tab 302, a setup tab 303 and a print quality tab 304. Arranged in the page setup tab 301 are functions, selected from among all the setup entries, that are frequently employed, such as a paper size 305, a printing direction 306, a color/gray scale 307 and the number of pages 308 for each sheet.

As is shown in FIG. 6, when the paper tab 302 is selected, the number of copies 405 to be printed, the printing 406, for which the printing unit is the number of copies, and reverse order printing 407 can be set.

As is shown in FIG. 7, when the setup tab 303 is selected, enlarged/reduced printing 505 and enlarged continuous (poster) printing 506 can be set.

As is shown in FIG. 8, when the print quality tab 304 is selected, a color/gray scale 605 and a print quality 606 can be set.

As is described above, a conventional printer driver must display the screens in FIGS. 5 to 8 so that a user can perform a desired printing setup for a printer.

However, when the user desires to confirm the contents of the printing setup, the conventional printer driver must also be permitted to display the screens in FIGS. 5 to 8. Thus, in order to confirm the number of copies that has been set, the user must select the paper tab 302 to display the paper setup screen (FIG. 6), and must then confirm the entry for the number of copies 405. To confirm the enlarged/reduced printing that has been set, the user must select the setup tab 303 to display the setup screen (FIG. 7), and must then confirm the entry for the enlarged/reduced printing 505. And finally, to confirm the print quality that has been set, the user must select the print quality tab 304, to display the print quality setup screen (FIG. 8), and must then confirm the entry for the print quality 606. For this confirmation process, the user must display each screen to confirm the printing setup entries for the printer, and this a very tedious and troublesome procedure.

In order to efficiently confirm the contents of a printing setup prepared for a printer, it has been requested that a printer driver compare the initial printing setup for a printer and a current printing setup, and that a differential printing setup be displayed for which the entries are the ones in the initial and the current printing setups that differ.

SUMMARY OF THE INVENTION

To respond to this request, it is one objective of the present invention to provide a printer driver that permits a user to efficiently confirm the contents of a printing setup for a printer.

To achieve this objective, according to a first aspect of the present invention, a printer driver comprises: printing setup comparison means for comparing initial printing setup contents, which are the initial contents of printing setup entries that indicate the printing conditions for a printer, with current printing setup contents, which are the current contents of the printing setup entries; and printing setup display means for displaying either the initial printing setup contents or the current printing setup contents and the printing setup entries, wherein for each of the printing setup entries the printing setup comparison means compares the initial printing setup contents with the current printing setup contents, wherein, when the printing setup comparison means ascertains that a difference exists between the initial printing setup contents and the current printing setup contents, the printing setup comparison means outputs, to the printing setup display means, a differential printing setup that includes differential printing setup contents, which indicate the current printing setup contents for which the difference exists, and a differential printing setup entry, which is the printing setup entry that corresponds to the differential printing setup contents, and wherein the printing setup display means displays the differential printing setup.

With this configuration, a printer driver can be provided that permits a user to efficiently confirm the contents of the printing setup for the printer.

DETAILED DESCRIPTION OF THE PREFERRED EMBODIMENT

The preferred embodiment of the present invention will now be described while referring to FIGS. 1 to 3.

Figure 1:
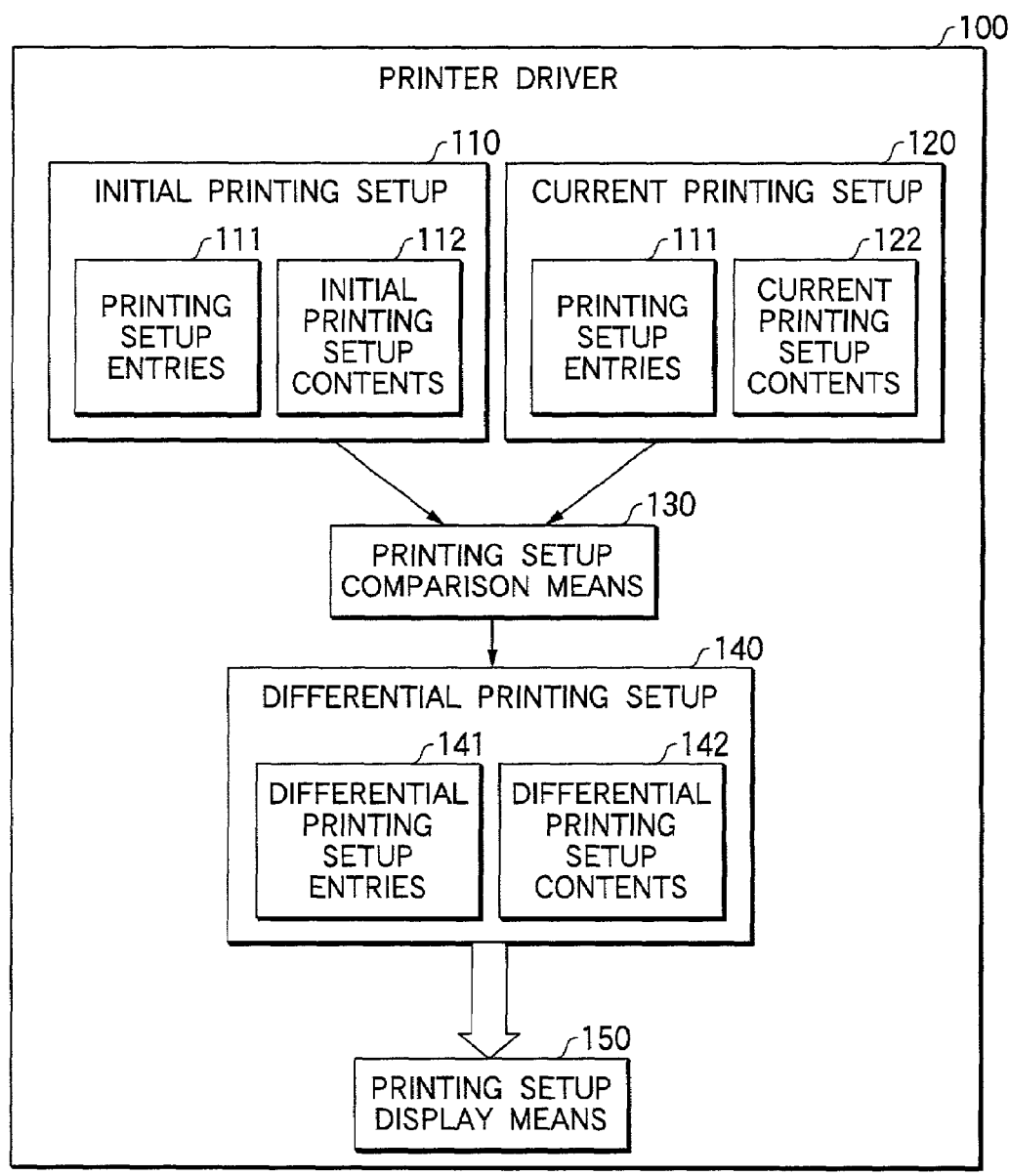
FIG. 1 is a diagram for explaining a printer driver according to one embodiment of the present invention.

FIG. 1 is a diagram for explaining a printer driver according to this embodiment.

In FIG. 1, a printer driver 100 comprises: printing setup comparison means 130 for comparing initial printing setup contents 112, which are the initial contents of printing setup entries 111 that are provided to designate the initial printing condition for a printer, with the current printing setup contents 122, which are the contents currently entered for the printing setup entries 111; and printing setup display means 150 for displaying the initial printing setup contents 112 or the current printing setup contents 122 and the printing setup entries 111. The printing setup comparison means 130 and the printing setup display means 150 may be provided either as hardware or as software.

The operation of the thus arranged printer driver 100 will now be described while referring to FIGS. 2 and 3. FIG. 2 is a diagram showing an example screen for displaying differential printing setup entries 141 and differential printing setup contents 142 for the printing setup entries 111 and the printing setup contents 122 in the current printing setup 120 that have been changed and that differ from those in the initial printing setup 110, and FIG. 3 is a flowchart showing the processing performed for comparing the current printing setup with the initial printing setup. For further reference, in Table 1 is shown an example initial printing setup for a printer prepared using a UI, in Table 2 is shown an example initial printing setup 110 entered by a user, and in Table 3 is shown an example current printing setup 120 for a printer.

TABLE 1

| | |
|---|---|
| paper size | A4 210 × 297 mm |
| medium type | regular paper |
| feeding method | paper cassette |
| printing direction | portrait |
| number of copies | one |
| print by the unit of copies | OFF |
| reverse-order print | OFF |
| enlarged/reduced print | No |
| double-sided print | No |
| number of pages for each sheet | one page |
| enlarged continuous (poster) print | No |
| color/gray scale | color |
| print quality | standard |

TABLE 2

| | |
|---|---|
| paper size | A4 210 × 297 mm |
| medium type | regular paper |
| feeding method | paper cassette |
| printing direction | portrait |
| number of copies | one |
| print by the unit of copies | OFF |
| reverse-order print | OFF |
| enlarged/reduced print | No |
| double-sided print | No |
| number of pages for each sheet | one page |
| enlarged continuous (poster) print | No |
| color/gray scale | color |
| print quality | standard |

TABLE 3

| | |
|---|---|
| paper size | B5 182 × 257 mm |
| medium type | regular paper |
| feeding method | paper cassette |
| printing direction | landscape |
| number of copies | one |
| print by the unit of copies | OFF |
| reverse-order print | OFF |
| enlarged/reduced print | No |
| double-sided print | No |
| number of pages for each sheet | two pages |
| enlarged continuous (poster) print | No |
| color/gray scale | color |
| print quality | high quality |

An explanation will now be given for the processing performed by the printer driver 100 when displaying the differential printing setup.

When the printer driver 100 displays the differential printing setup, the printing setup comparison means 130 compares the current printing setup contents 122, which correspond to the printing setup entries 111 that constitute the current printing setup 120 for the printer, with the initial printing setup contents 112, which correspond to the initial setup entries 111 that constitute the initial printing setup 110 for the printer. Then, the printing setup comparison means 130 identifies, as the differential printing setup 140, a difference between the initial printing setup 110 and the current printing setup 120. When the initial printing setup contents 112 and the current printing setup contents 122 differ, the printing setup entries 111 that correspond to the different setup contents are regarded as differential printing setup entries 141, and the current printing setup contents 122 that correspond to the differential printing setup entries 141 are defined as differential printing setup contents 142. Then, the printing setup display means 150 employs a display device (not shown) to display the differential printing setup entries 141 and the differential printing setup contents 142.

Figure 2:
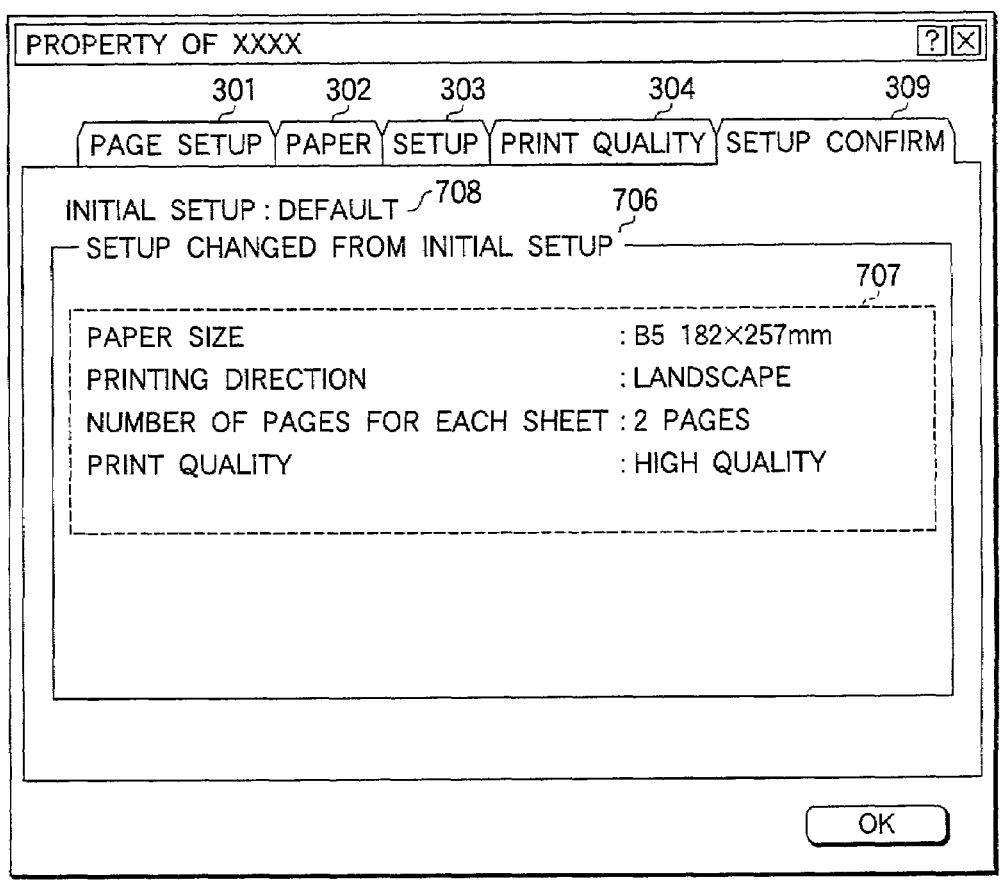
FIG. 2 is a diagram showing an example screen for displaying differential printing setup entries and differential printing setup contents for those in the current printing setup that have been changed and that differ from those in the initial printing setup.
Figure 3:
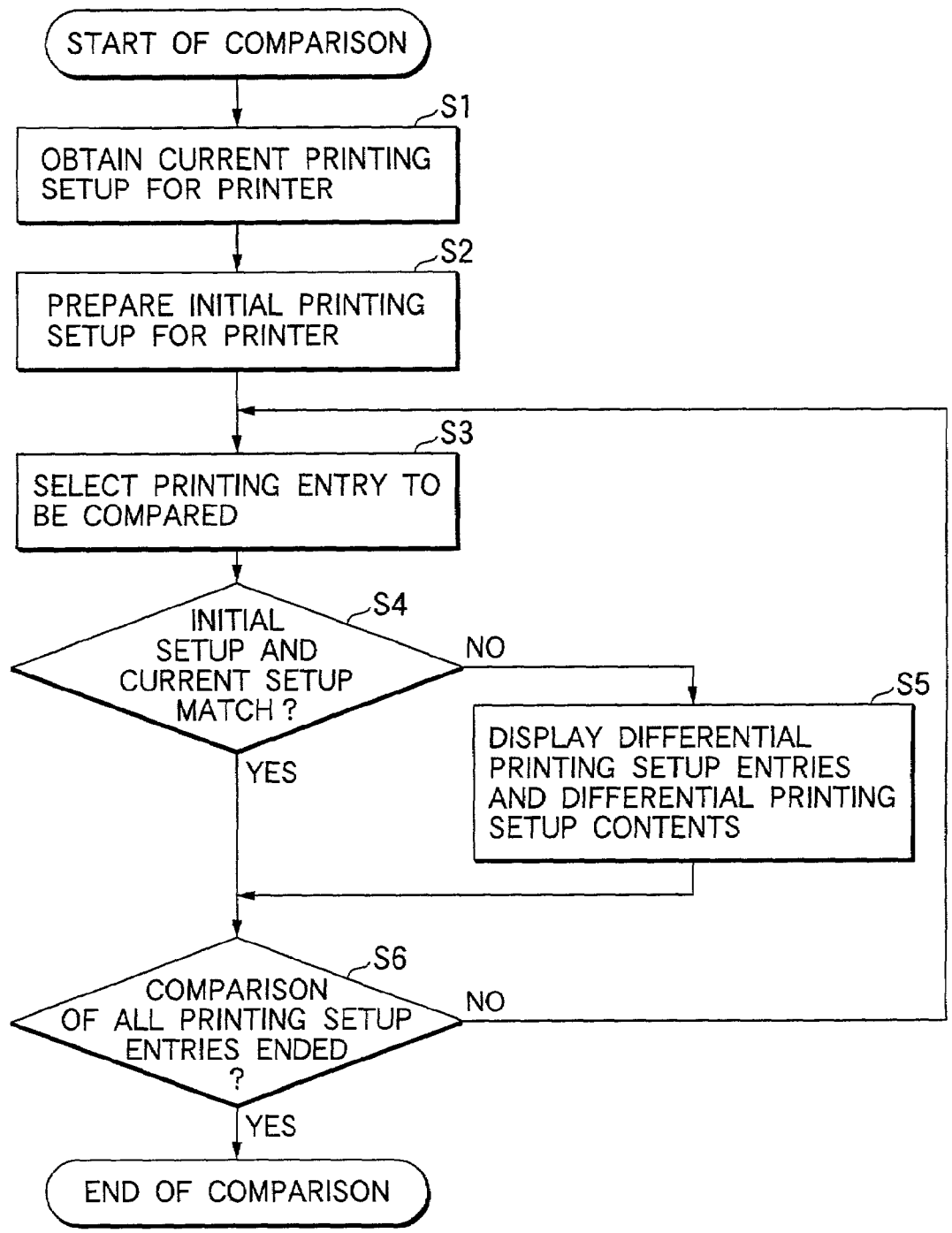
FIG. 3 is a flowchart showing the processing performed to compare the initial printing setup with the current printing setup.
Figure 4:
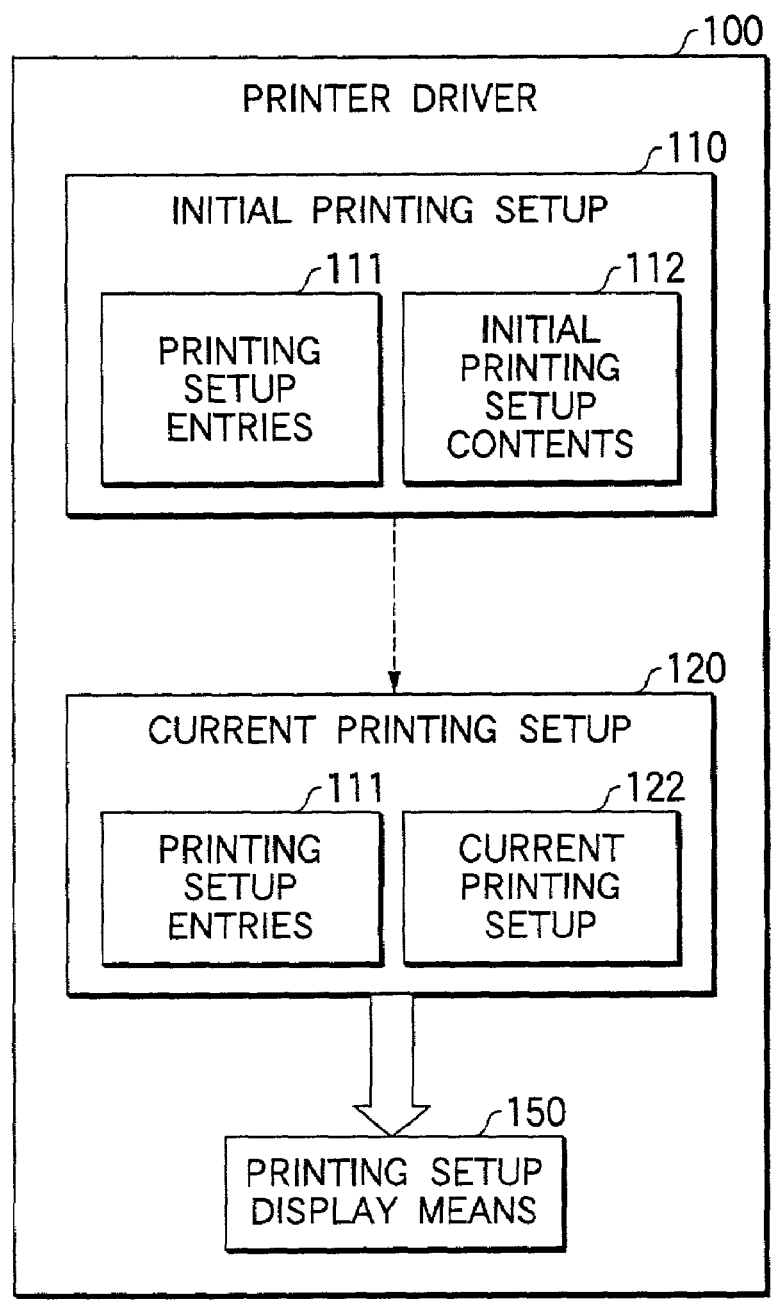
FIG. 4 is a diagram for explaining a conventional printer driver.
Figure 5:
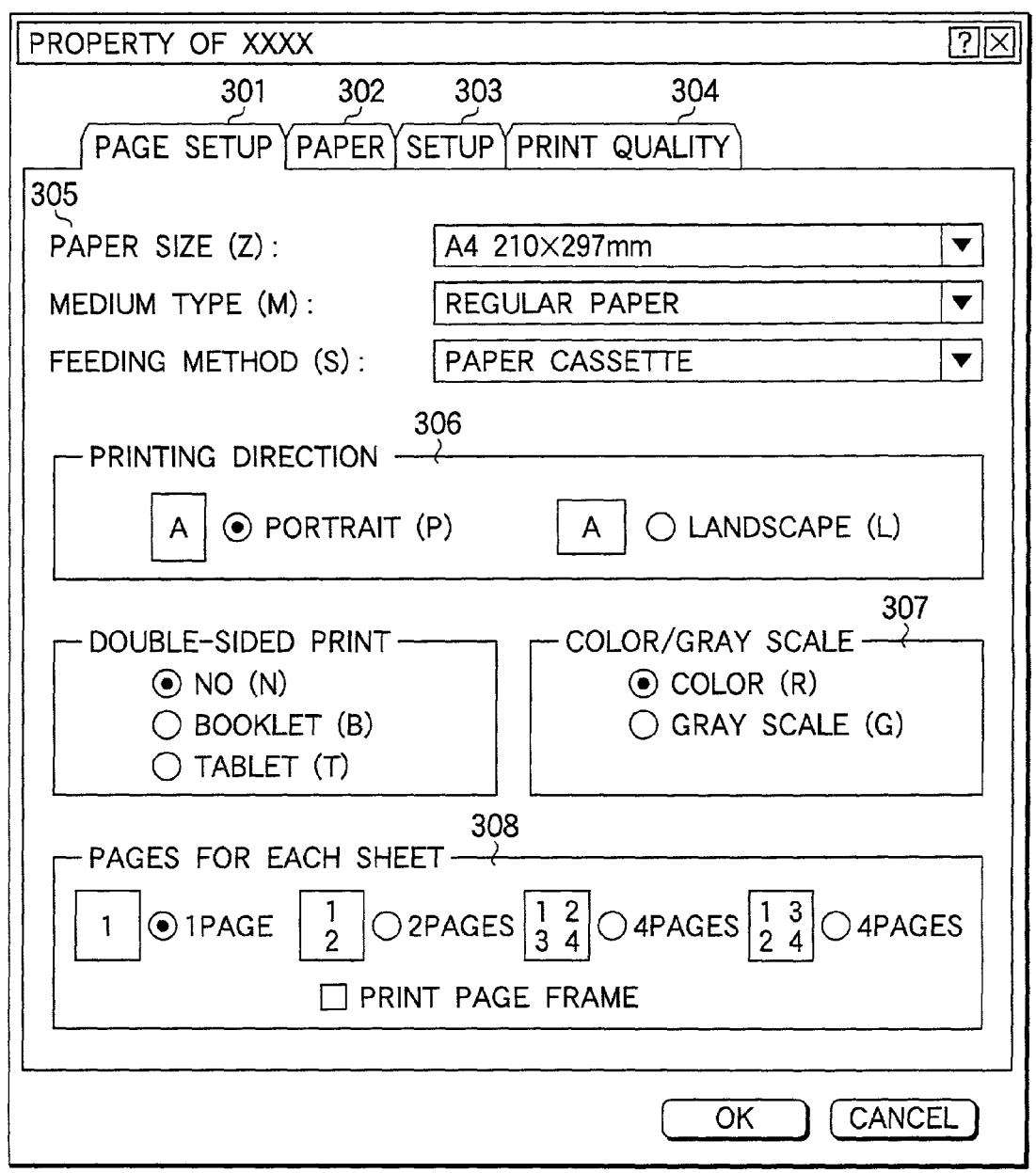
FIG. 5 is a diagram showing an example printing setup screen for a printer.
Figure 6:
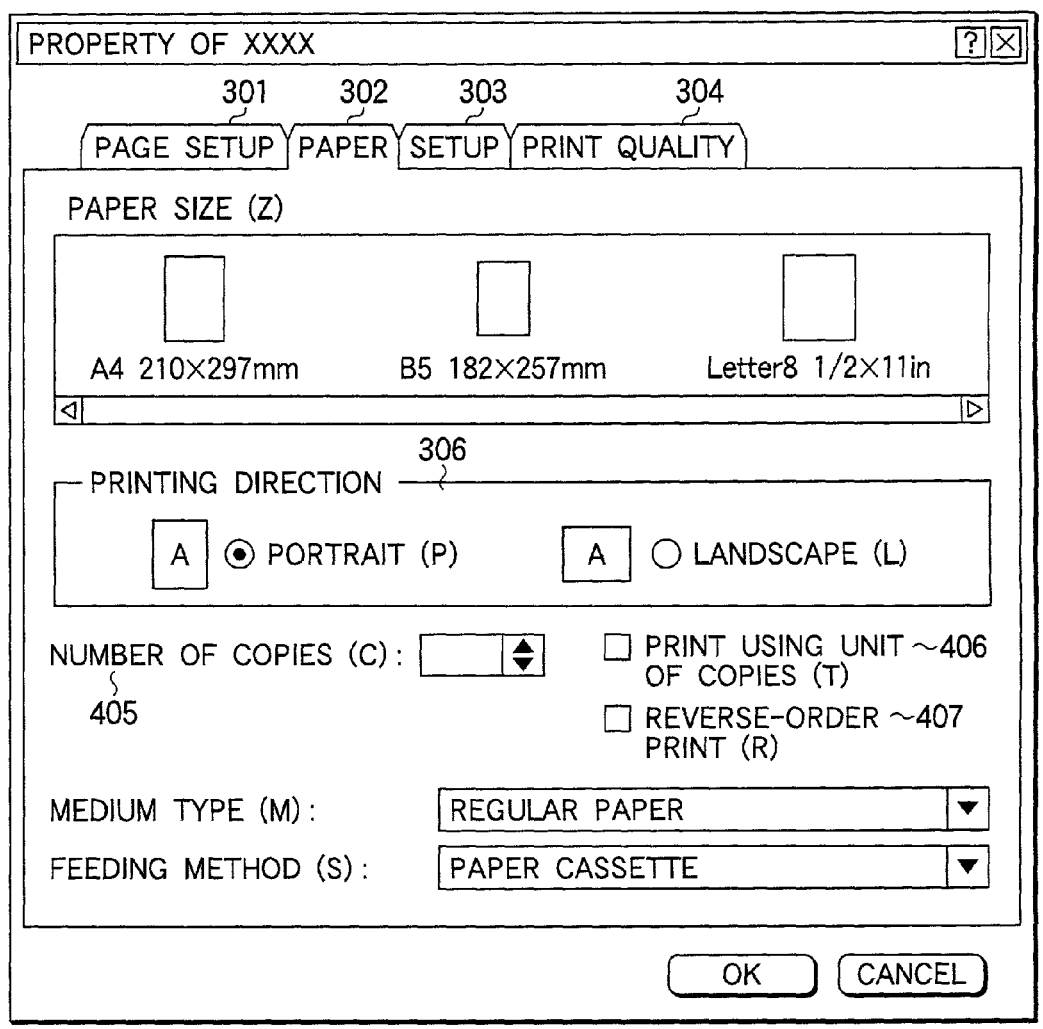
FIG. 6 is a diagram showing an example setup screen when a paper tab is selected.
Figure 7:
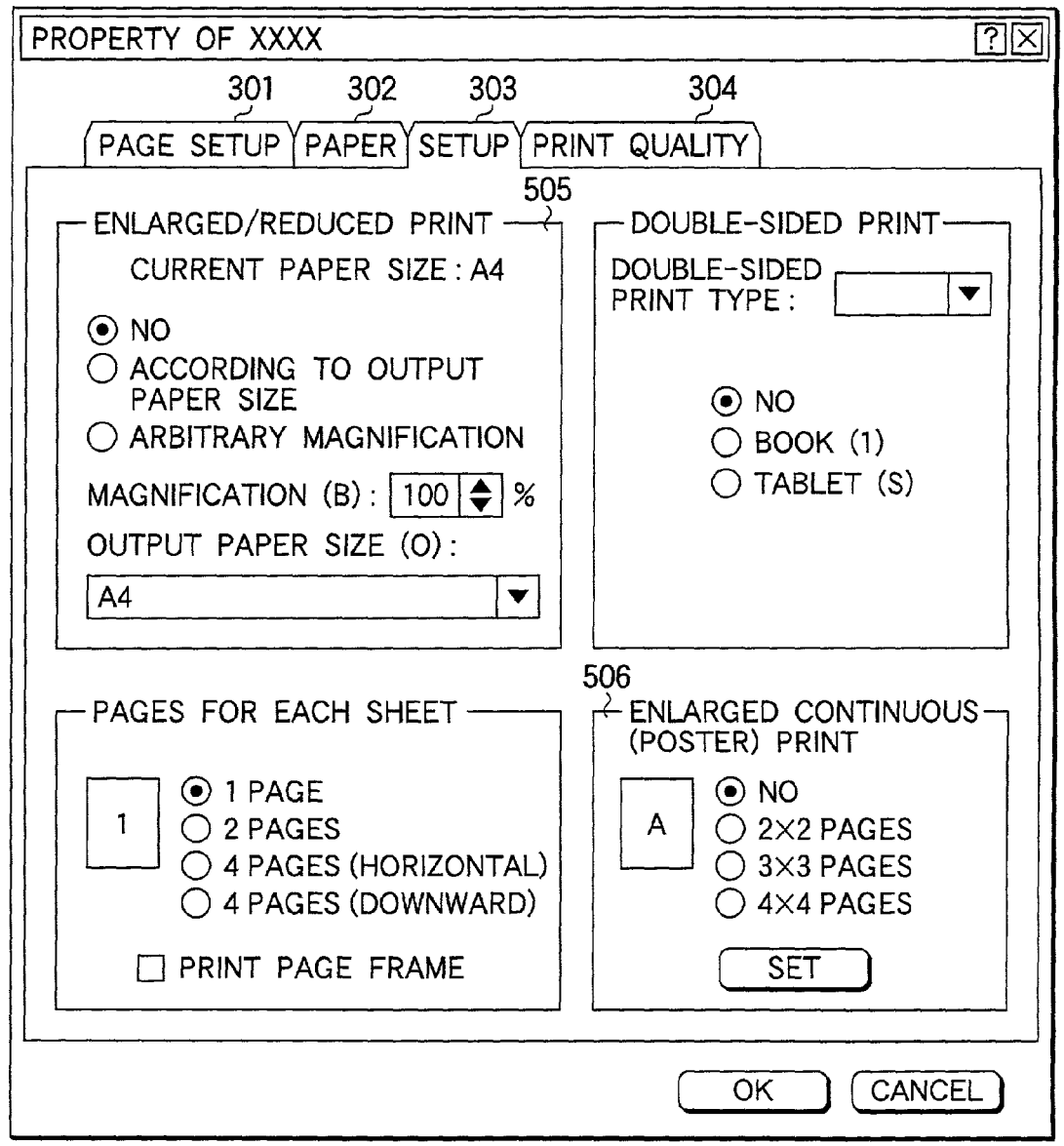
FIG. 7 is a diagram showing an example setup screen when a setup tab is selected.
Figure 8:
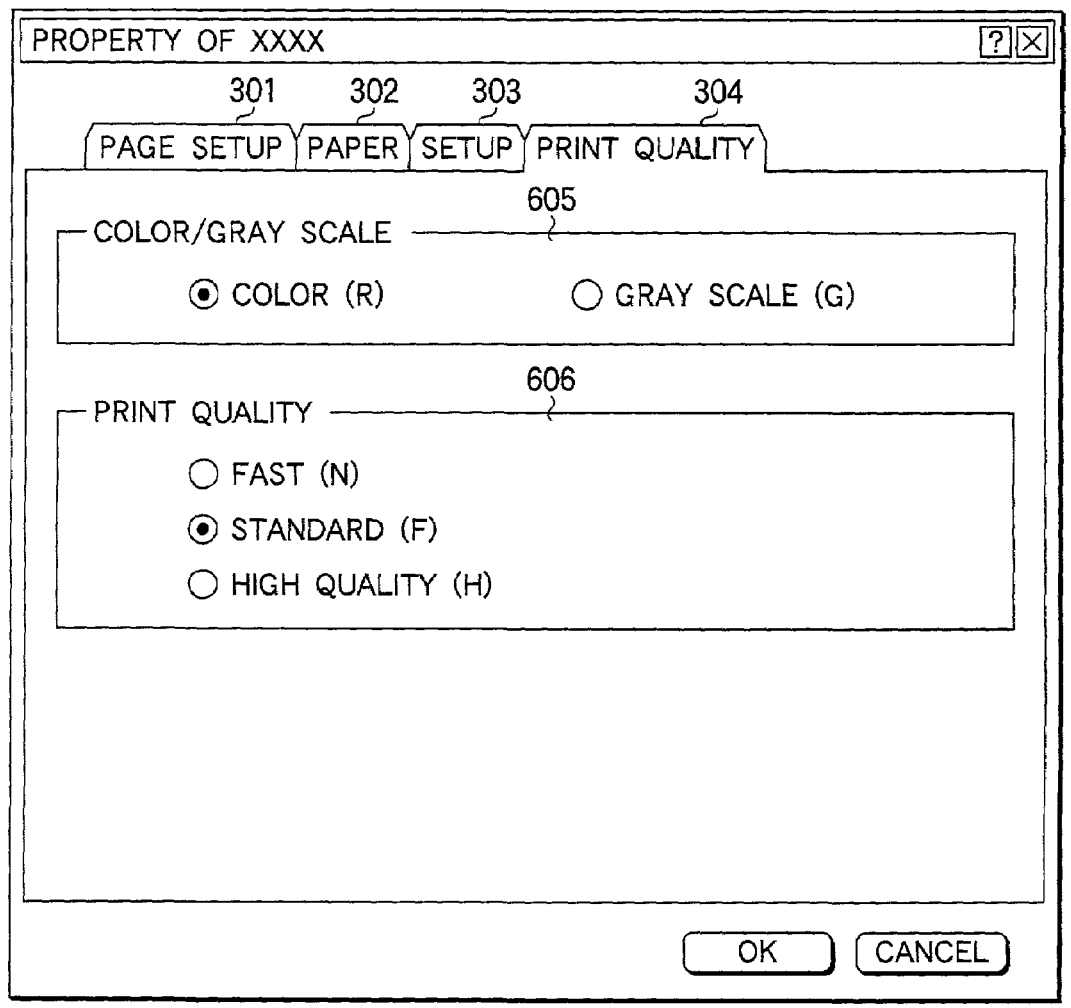
FIG. 8 is a diagram showing an example setup screen when a print quality tab is selected.

FIG. 2 is a diagram showing an example screen display for the differential printing setup entries 141 and the differential printing setup contents 142 for the current printing setup 120 that includes the changes made to the initial printing setup 110. In this example, when a setup confirmation tab 309 is selected, for the current printing setup 120 that includes the changes made to the initial printing setup 110, the differential printing setup entries 141 and the differential printing setup contents 142 are displayed as a setup 706 that includes changes made to the initial setup 708. Further, in the initial setup 708, a name correlated with the initial printing setup 110 is displayed, while a DEFAULT entry is used to indicate that the name refers to the initial printing setup for the printer that was designated when a user interface was employed and a printing-available environment was set for a computer.

Assume that the setup for a printer driver that is operating under the initial printing setup 110 shown in Table 1 is changed to the current printing setup 120 shown in Table 3. In this example, the setup for the paper size is changed from the initial A4 to B5, the setup for the printing direction is changed from the initial portrait to landscape, the setup for the number of pages for each sheet is changed from the initial one page to two pages, and the setup for the print quality is changed from the initial standard to high quality. When the setup confirmation tab 309 is selected under these conditions, in the setup 706, a box 707 is displayed in which the initial setup entries that were updated are shown. And in the initial setup 708, a name is displayed that is correlated, using the UI, with the initial printing setup 110.

Further, assume that the initial printing setup 110 that was entered by a user and is shown in Table 2 is changed to the current printing setup 120 shown in Table 3. In this example, the setup for the paper size is changed from the initial A4 to B5, the setup for the printing direction is changed from the initial portrait to landscape, the setup for the number of pages for each sheet is changed from the initial one to two, and the setup for the print quality is changed from the initial standard to high quality. When the setup confirmation tab 309 is selected under these conditions, in the setup 706, the box 707 is displayed in which the changes to the updated initial setup are shown. And in the initial setup 708, a user designated name is displayed that is correlated with the initial printing setup 110.

No special limitations are placed on the employment of the method used to set a name corresponding to the initial printing setup 110, the method used to save the initial printing setup 110 entered by the user, and the method used to call this initial printing setup 110.

As for the current printing setup 120 that has been acquired by using multiple tabs, arranged for the individual associated entries, for changing the initial printing setup 110, the differential printing setup entries 141 and the differential printing setup contents 142 are displayed in the setup 706 that is acquired by updating the initial setup.

The processing for comparing the current printing setup 120 with the initial printing setup 110 will now be described while referring to FIG. 3.

When the setup confirmation tab 309 is selected to display the differential printing setup entries 141 and the differential printing setup contents 142 that are related to the current printing setup 120, which includes the changes to the initial printing setup 110, the current printing setup 120 is obtained from the memory area (S1). A memory area for the initial printing setup 110 is then obtained, and the initial printing setup 110 is stored therein (S2). Then, the printing setup entry 111 to be compared is selected (S3), and the initial printing setup 110 is compared with the current printing setup 120 (S4). When the initial printing setup 110 and the current printing setup 120 match, it is assumed that the setup has not been changed, and the differential printing setup entry 141 and the differential printing setup contents 142 are not displayed. When the initial printing setup 110 and the current printing setup 120 do not match, the differential printing setup entry 141 and the differential printing setup contents 142 are displayed (S5). A check is then performed to determine whether the comparison has been completed for all the printing setup entries 111 (S6), and when it is ascertained that the comparison of all the printing setup entries 111 has not yet been completed, the processes at steps S3 to S6 are repeated. However, when it is ascertained that the comparison of all the printing setup entries 111 has been completed, the memory area that was obtained for storing the initial printing setup 110 is released, and the processing is thereafter terminated.

Through this processing, for the current printing setup 120, which has been obtained by changing the initial printing setup 11O using multiple tabs that are arranged for the individual associated entries, the differential printing setup entries 141 and the differential printing setup contents 142 are displayed in the setup 706 as changed from the initial setup on the setup screen (FIG. 2) that is presented when the setup confirmation tab 309 is selected.

As is described above, according to this embodiment, the printer driver comprises: the printing setup comparison means 130 for comparing the initial printing setup contents 112, which are the initial contents of the printing setup entries 111 that indicate the printing conditions for a printer, with the current printing setup contents 122, which are the contents of the printing setup entries 111; and the printing setup display means 150 for displaying either the initial printing setup contents 112 or the current printing setup contents 122 and the printing setup entries 111. For each of the printing setup entries 111 the printing setup comparison means 130 compares the initial printing setup contents 112 with the current printing setup contents 122. When the printing setup comparison means 130 ascertains that a difference exists between the initial printing setup contents 112 and the current printing setup contents 122, the printing setup comparison means 130 outputs, to the printing setup display means 150, a differential printing setup 140 that includes differential printing setup contents 142, which indicate the current printing setup contents 122 for which the difference exists, and a differential printing setup entry 141, which is the printing setup entry that corresponds to the differential printing setup contents 142. The printing setup display means 150 displays the differential printing setup 140. With this configuration, since the initial printing setup 110 can be compared with the current printing setup 120, and since the differential printing setup 140, which is the difference between the initial printing setup 110 and the current setup 120, can be displayed by the printing setup display means 150, the user can efficiently confirm the contents of the printing setup for the printer.

Further, the initial printing setup contents are designated by employing a user interface (UI) that is used when a printing-available environment has been set for a computer. With this configuration, since the current printing setup 120 for the printer can be compared with the initial printing setup 110 when the printing-available environment has been set for a computer, and since the differential printing setup 140 can be displayed for which the contents are those in the current setup 120 that differ from the contents in the initial current setup 110, the user can efficiently confirm the contents of the current printing setup for the printer.

Furthermore, the initial printing setup contents are those set by a user. With this configuration, since the current printing setup 120 for the printer can be compared with the initial printing setup 110 that was entered by the user following the setting for the computer of the printing-available environment, and since the differential printing setup 140 can be displayed for which the contents are those in the current printing setup 120 that differ from those in the initial printing setup 110, the user can efficiently confirm the contents of the current printing setup for the printer.

As is described above, according to the first aspect of the invention, the printer driver comprises: the printing setup comparison means for comparing the initial printing setup contents, which are the initial contents of the printing setup entries that indicate the printing conditions for a printer, with the current printing setup contents, which are the current contents of the printing setup entries; and the printing setup display means for displaying either the initial printing setup contents or the current printing setup contents and the printing setup entries, wherein for each of the printing setup entries the printing setup comparison means compares the initial printing setup contents with the current printing setup contents, wherein, when the printing setup comparison means ascertains that a difference exists between the initial printing setup contents and the current printing setup contents, the printing setup comparison means outputs, to the printing setup display means, a differential printing setup that includes differential printing setup contents, which indicate the current printing setup contents for which the difference exists, and a differential printing setup entry, which is the printing setup entry that corresponds to the differential printing setup contents, and wherein the printing setup display means displays the differential printing setup. With this configuration, since the initial printing setup can be compared with the current printing setup, and since the differential printing setup, which is the difference between the initial setup and the current setup, can be displayed by the printing setup display means, the user can efficiently confirm the contents of the printing setup for the printer.

According to the second aspect of the present invention, for the printer driver of the first aspect, the initial printing setup contents are designated by employing a user interface that is used when a printing-available environment has been set for a computer. With this configuration, since the current printing setup for the printer can be compared with the initial printing setup when the printing-available environment has been set for a computer, and since the differential printing setup can be displayed for which the contents are those in the current setup that differ from the contents in the initial current setup, the user can efficiently confirm the contents of the current printing setup for the printer.

According to the third aspect of the present invention, for the printer driver of the first aspect, the initial printing setup contents are those set by a user. With this configuration, since the current printing setup for the printer can be compared with the initial printing setup that was entered by the user following the setting for the computer of the printing-available environment, and since the differential printing setup can be displayed for which the contents are those in the current printing setup that differ from those in the initial printing setup, the user can efficiently confirm the contents of the current printing setup for the printer.

What is claimed is:

1. A printer driver comprising:
    printing setup comparison means for comparing initial printing setup contents, which are the initial contents of printing setup entries that indicate the printing conditions for a printer, with current printing setup contents, which are the current contents of the printing setup entries; and
    printing setup display means for displaying either said initial printing setup contents or said current printing setup contents and said printing setup entries,
    wherein said printing setup comparison means compares said initial printing setup contents with said current printing setup contents for each of said printing setup entries,
    wherein said printing setup comparison means outputs a differential printing setup to said printing setup display means when said printing comparison means ascertains that a difference exists between said initial printing setup contents and said current printing setup contents, wherein said differential printing setup includes differential printing setup contents, which indicate that said difference exists, and a differential printing setup entry that corresponds to said differential printing setup contents, and
    wherein said printing setup display means displays said differential printing setup.

2. A printer driver according to claim 1, wherein said initial printing setup contents are designated by employing a user interface that is used when a printing-available environment has been set for a computer.

3. A printer driver according to claim 1, wherein said initial printing setup contents are those set by a user.

4. An information processing apparatus, for displaying a printing setup screen for a printer on a monitor screen, the printing setup screen employing multiple setup tabs, the multiple setup tabs indicating printing setup entries and printing setup contents for said printer, the information processing apparatus comprising:
    a differential printing setup tab for displaying differential printing setup contents and the printing setup entries containing the differential printing setup contents on a monitor screen, the differential printing setup contents indicating difference between initial printing setup contents and latest printing setup contents.

5. An information processing apparatus according to claim 4, wherein said initial setup contents are the setup contents designated when a printing-available environment is first set for a computer.

6. An information processing apparatus according to claim 4, wherein said initial setup contents are contents set as initial values by a user.

7. An information processing method, for displaying a printing setup screen for a printer on a monitor screen, the printing setup screen employing multiple setup tabs, the multiple setup tabs indicating printing setup entries and printing setup contents for said printer, the information processing method comprising:
    displaying differential printing setup contents and the printing setup entries containing the differential printing setup contents on a monitor screen, the differential printing setup contents indicating difference between an initial printing setup contents and a latest printing setup contents.

8. An information processing method according to claim 7, wherein said initial setup contents are setup contents designated when a printing-available environment is first set for a computer.

9. An information processing method according to claim 4, wherein said initial setup contents are contents set as initial values by a user.

10. A printer driver for displaying a printing setup screen for a printer on a monitor screen, the printing setup screen employing multiple setup tabs, the multiple setup tabs indicating printing setup entries and printing setup contents for said printer, the printer driver comprising:
    a differential printing setup tab for displaying differential printing setup contents and the printing setup entries containing the differential printing setup contents, the differential printing setup contents being included in the latest printing setup contents of the printing setup entries and being not included in the initial printing setup contents of the printing setup entries.

11. An information processing apparatus, for providing a layout of a printing setup screen for a printer, which is displayed on a monitor screen, the printing setup screen indicating printing setup entries and printing setup contents for the printer, the information processing apparatus comprising:

an area in the printing setup screen including a plurality of differential printing setup entries and a plurality of differential printing setup contents indicating difference between initial printing setup contents and latest printing setup contents, the plurality of differential printing setup contents corresponding to the plurality of differential printing setup entries.

12. An information processing apparatus according to claim 11, wherein the area includes only the plurality of differential printing setup entries and the plurality of differential printing setup contents.

* * * * *